(12) United States Patent
Shi et al.

(10) Patent No.: US 11,832,180 B2
(45) Date of Patent: Nov. 28, 2023

(54) INFORMATION TRANSMISSION METHOD AND ELECTRONIC DEVICE

(71) Applicant: BEIJING XIAOMI MOBILE SOFTWARE CO., LTD., Beijing (CN)

(72) Inventors: Runyu Shi, Beijing (CN); Ming Lu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 315 days.

(21) Appl. No.: 17/334,269

(22) Filed: May 28, 2021

(65) Prior Publication Data

US 2022/0159573 A1 May 19, 2022

(30) Foreign Application Priority Data

Nov. 13, 2020 (CN) .......................... 202011272464.X

(51) Int. Cl.
*H04W 52/02* (2009.01)
*H04B 17/318* (2015.01)
(Continued)

(52) U.S. Cl.
CPC ........ *H04W 52/0229* (2013.01); *H04B 11/00* (2013.01); *H04B 17/318* (2015.01); *H04W 4/80* (2018.02); *H04W 76/11* (2018.02)

(58) Field of Classification Search
CPC ... H04W 52/0229; H04W 4/80; H04W 76/11; H04B 11/00; H04B 17/318; G08C 23/02; G08C 17/02
See application file for complete search history.

(56) References Cited

U.S. PATENT DOCUMENTS

| 5,018,114 A | 5/1991 | Mackelburg |
| 6,763,106 B1 | 7/2004 | Li |

(Continued)

FOREIGN PATENT DOCUMENTS

| CN | 101845950 A | 9/2010 |
| CN | 202406118 U | 8/2012 |

(Continued)

OTHER PUBLICATIONS

What is the principle of Alipay's acoustic payment (in person)? https://www.zhihu.com/question/20946901, (11p).

(Continued)

*Primary Examiner* — Habte Mered
(74) *Attorney, Agent, or Firm* — Arch & Lake LLP

(57) ABSTRACT

An information transmission method and an electronic device are provided. The information transmission method is applied to an ultrasonic wave transmitting device, and includes: transmitting a Bluetooth wake-up signal; obtaining an ultrasonic transmission signal based on information to be transmitted; and transmitting the ultrasonic transmission signal to an ultrasonic wave receiving device, wherein the Bluetooth wake-up signal is configured to wake up the ultrasonic wave receiving device to receive the ultrasonic transmission signal. In the ultrasonic wave receiving device, such elements as a decoder and an acoustic wave receiver may be in a normally-off state; and when it is needed to transmit information through an ultrasonic wave, the ultrasonic wave transmitting device first transmits the Bluetooth wake-up signal; and upon the reception of the Bluetooth wake-up signal, the ultrasonic wave receiving device wakes up related elements to receive the ultrasonic signal.

15 Claims, 16 Drawing Sheets

(51) Int. Cl.
*H04W 4/80* (2018.01)
*H04W 76/11* (2018.01)
*H04B 11/00* (2006.01)

(56) References Cited

U.S. PATENT DOCUMENTS

| | | | |
|---|---|---|---|
| 9,361,877 B2 | 6/2016 | Yeary | |
| 10,176,815 B1 * | 1/2019 | Chmiel | G10L 19/012 |
| 11,275,164 B2 * | 3/2022 | Yoon | G01S 11/06 |
| 2009/0145232 A1 | 6/2009 | Suginouchi | |
| 2012/0218865 A1 | 8/2012 | Dinter | |
| 2013/0114380 A1 * | 5/2013 | Bryger | G06F 3/017 367/199 |
| 2013/0271088 A1 | 10/2013 | Hwang et al. | |
| 2013/0294050 A1 * | 11/2013 | Lee | G08C 17/02 362/86 |
| 2013/0315039 A1 | 11/2013 | Ahn et al. | |
| 2014/0043933 A1 | 2/2014 | Belevich | |
| 2014/0050321 A1 | 2/2014 | Albert | |
| 2014/0119162 A1 | 5/2014 | Yeary et al. | |
| 2015/0176988 A1 * | 6/2015 | Cho | H04M 1/72412 702/158 |
| 2016/0352435 A1 | 12/2016 | Yoshizawa et al. | |
| 2017/0141811 A1 | 5/2017 | Gabai et al. | |
| 2017/0279571 A1 | 9/2017 | Melodia et al. | |
| 2018/0255111 A1 | 9/2018 | Zhang et al. | |
| 2018/0365981 A1 | 12/2018 | Nakayama et al. | |
| 2019/0281547 A1 * | 9/2019 | Yoon | H04N 21/42684 |
| 2020/0074844 A1 | 3/2020 | Mirzavand et al. | |
| 2022/0085941 A1 | 3/2022 | Chen | |
| 2022/0096852 A1 * | 3/2022 | Alvarez | G16H 40/67 |

FOREIGN PATENT DOCUMENTS

| | | | |
|---|---|---|---|
| CN | 103806902 A | 5/2014 | |
| CN | 103959201 A | 7/2014 | |
| CN | 104901779 A | 9/2015 | |
| CN | 105187282 A | 12/2015 | |
| CN | 105356948 A | 2/2016 | |
| CN | 105846911 A | 8/2016 | |
| CN | 106095143 A | 11/2016 | |
| CN | 106600922 A | 4/2017 | |
| CN | 107197069 A | 9/2017 | |
| CN | 107645343 A | 1/2018 | |
| CN | 108075837 A | 5/2018 | |
| CN | 109166593 A | 1/2019 | |
| CN | 109814457 A | 5/2019 | |
| CN | 109936670 A | 6/2019 | |
| CN | 110235022 A | 9/2019 | |
| CN | 111445649 A | 7/2020 | |
| CN | 111769885 A | 10/2020 | |
| CN | 111782284 A | 10/2020 | |
| CN | 111884728 A | 11/2020 | |
| EP | 2950467 A1 | 12/2015 | |
| EP | 3098983 A1 | 11/2016 | |
| EP | 3393063 A1 | 10/2018 | |
| KR | 101597657 B1 | 2/2016 | |
| WO | 2010051728 A1 | 5/2010 | |
| WO | 2016001879 A1 | 1/2016 | |
| WO | WO-2016001879 A1 * | 1/2016 | G10L 19/018 |
| WO | 2018160436 A1 | 9/2018 | |
| WO | WO-2019182646 A1 * | 9/2019 | G06Q 10/02 |

OTHER PUBLICATIONS

First Office Action of the Chinese application No. 202010604375.4, dated Mar. 29, 2021.
Author: Night Ranger, Title: Principles of Alipay's Sonic Payment (Pay in Person), Source: Zhihu, Link: https://www.zhihu.com/question/20946901/answer/41899098.
European Search Report in the European application No. 21165134.4, dated Sep. 30, 2021.
First Office Action of the U.S. Appl. No. 17/213,176, dated Jul. 8, 2022.
Final Office Action of the U.S. Appl. No. 17/213,176, dated Dec. 30, 2022.
First Office Action after RCE of the U.S. Appl. No. 17/213,176, dated Mar. 30, 2023.
Second Office Action of the Chinese application No. 202010604375.4, dated Nov. 26, 2021.
Notice of Allowance of the Chinese application No. 202010604375.4, dated Jan. 17, 2022.
First Office Action of the Chinese application No. 202010591091.6, dated Apr. 1, 2021.
Notice of Allowance of the Chinese application No. 202010591091.6, dated Sep. 8, 2021.
European Search Report in the European application No. 21165719.2, dated Sep. 28, 2021.
First Office Action of the U.S. Appl. No. 17/205,431, dated Sep. 29, 2022.
Office Action of the Indian application No. 202144013069, dated Feb. 4, 2022.
Supplementary European Search Report in the European application No. 21176418.8, dated Nov. 19, 2021, (10p).

* cited by examiner

INFORMATION TRANSMISSION METHOD AND ELECTRONIC DEVICE

CROSS-REFERENCE TO RELATED APPLICATIONS

The present Application claims the priority to Chinese Patent Application No. 202011272464.X filed on Nov. 13, 2020, the contents of which are incorporated herein by reference in their entirety.

BACKGROUND

In short-distance wireless information transmission, the transmission based on an ultrasonic wave is a low-cost solution.

During transmitting information based on the ultrasonic wave, it is needed to encode the information to be transmitted into ultrasonic data, and then decode the ultrasonic data as the information to be transmitted.

In order to receive the ultrasonic data timely, the elements for receiving the ultrasonic wave, the elements for digital-to-analog conversion, the elements for decoding or the like are in a working state all the time, such that the power consumption of the ultrasonic wave receiving device for receiving the ultrasonic wave increases significantly; or, even when the ultrasonic wave receiving device is not in the working state all the time, it is needed to turn on or turn off the ultrasonic wave receiving device manually.

SUMMARY

The present disclosure provides an information transmission method, and an electronic device.

According to a first aspect of the examples of the disclosure, an information transmission method is provided. The method is applied to an ultrasonic wave transmitting device, and includes: transmitting a Bluetooth wake-up signal; obtaining an ultrasonic transmission signal based on information to be transmitted; and transmitting the ultrasonic transmission signal to an ultrasonic wave receiving device, in which the Bluetooth wake-up signal is configured to wake up the ultrasonic wave receiving device to receive the ultrasonic transmission signal.

According to a second aspect of the examples of the disclosure, another information transmission method is provided. The method is applied to an ultrasonic wave receiving device, and includes: receiving a Bluetooth wake-up signal transmitted from an ultrasonic wave transmitting device; generating a wake-up instruction based on the Bluetooth wake-up signal; receiving, in response to the wake-up instruction, an ultrasonic transmission signal transmitted from the ultrasonic wave transmitting device; and obtaining corresponding transmission information based on the ultrasonic transmission signal.

According to a third aspect of the examples of the disclosure, an electronic device is provided, which may include: a processor; and a memory configured to store an instruction executable by the processor; and the processor is configured to call the instruction to perform: transmitting a Bluetooth wake-up signal; obtaining an ultrasonic transmission signal based on information to be transmitted; and transmitting the ultrasonic transmission signal to an ultrasonic wave receiving device, in which the Bluetooth wake-up signal is configured to wake up the ultrasonic wave receiving device to receive the ultrasonic transmission signal.

It is to be understood that the foregoing general descriptions and following detailed descriptions are only exemplary and explanatory and not intended to limit the disclosure.

BRIEF DESCRIPTION OF THE DRAWINGS

The accompanying drawings are incorporated in and constitute a part of this specification, illustrate examples consistent with the disclosure and, together with the description, serve to explain the principles of the disclosure.

DETAILED DESCRIPTION

Figure 1:
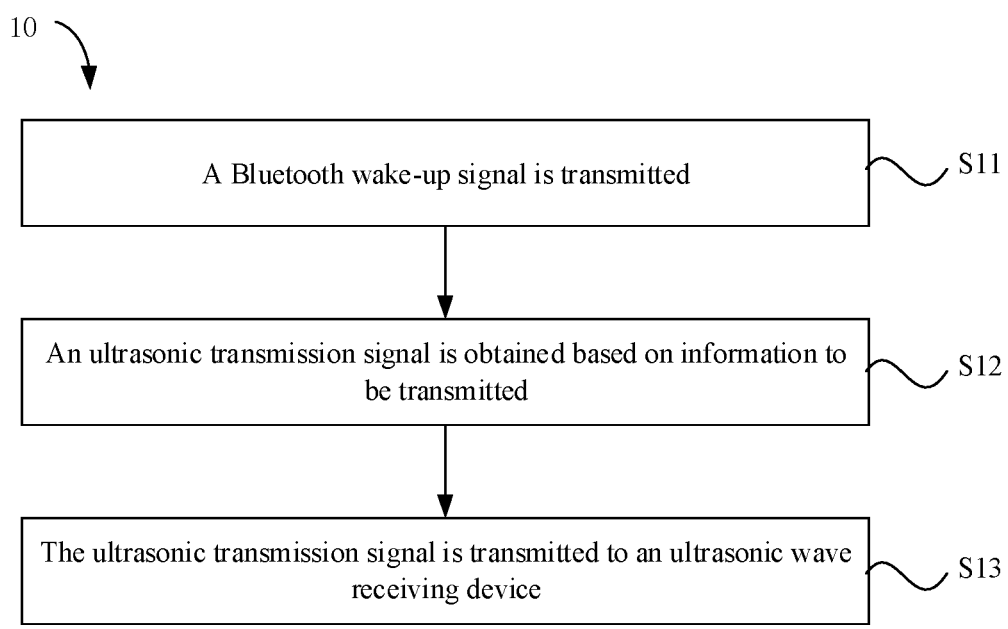
FIG. 1 is a flow chart of an information transmission method according to at least some examples.

Here, examples are described in detail, examples of which are illustrated in the accompanying drawings. In the following description related to the accompanying drawings, the same numbers in different drawings represented the same or similar elements unless otherwise represented. The implementations described in the following examples do not represented all the implementations consistent with the disclosure. Instead, they are merely examples of the devices and methods consistent with the disclosure.

Within the short-distance range, the information transmission using wireless technologies has become one of the most common manners for information transmission at present. With regard to short-distance transmission for wireless data, infrared radiation transmission, radio electromagnetic wave transmission and ultrasonic transmission are commonly used nowadays.

The information transmission using the infrared radiation is low in cost and easy in implementation. But for the information transmission based on the infrared radiation, there is a need for visual communication between a transmitter and a receiver all the time. Once the communication is interrupted, the information transmission based on the infrared radiation is also interrupted therewith.

The information transmission using the radio wave may ensure the timeliness and accuracy of the information transmission, but the cost for such transmission is a high in implementation. Furthermore, each country has different regulations on the radio wave, such that the uniform transmission method or uniform band cannot be used for information transmission throughout the world.

The difficulty and cost for the ultrasonic transmission are low. Furthermore, for the information transmission using the ultrasonic wave, positions of the transmitting device and receiving device are relatively free. Further, the ultrasonic wave transmitting device and ultrasonic wave receiving device such as a speaker, an earphone and a microphone are originally disposed on the common terminal device at present, so there is no additional expense in hardware cost. Therefore, based on the ultrasonic wave, the information transmission in the short distance with few traffic has a wide application prospect.

During transmitting information based on the ultrasonic wave, the information to be transmitted will be encoded into ultrasonic data, and the ultrasonic data is then decoded as the information to be transmitted. Sometimes, the information is transmitted using the ultrasonic wave, the receiver that receives the ultrasonic wave needs to be in a working state, which causes huge power consumption. Even when the ultrasonic wave receiving device is not in the working state all the time, the ultrasonic wave receiving device needs to be turned on or turned off manually, which creates a poor user experience.

According to the information transmission method 10 provided in the disclosure, on the premise that the ultrasonic wave receiving device may timely acquire and decode the signal, the acquisition element, decoding device or the like in the ultrasonic wave receiving device may not have to stay in the working state all the time, such that the power consumption of the ultrasonic wave receiving device can be reduced, and the user experience can be improved.

Figure 2:
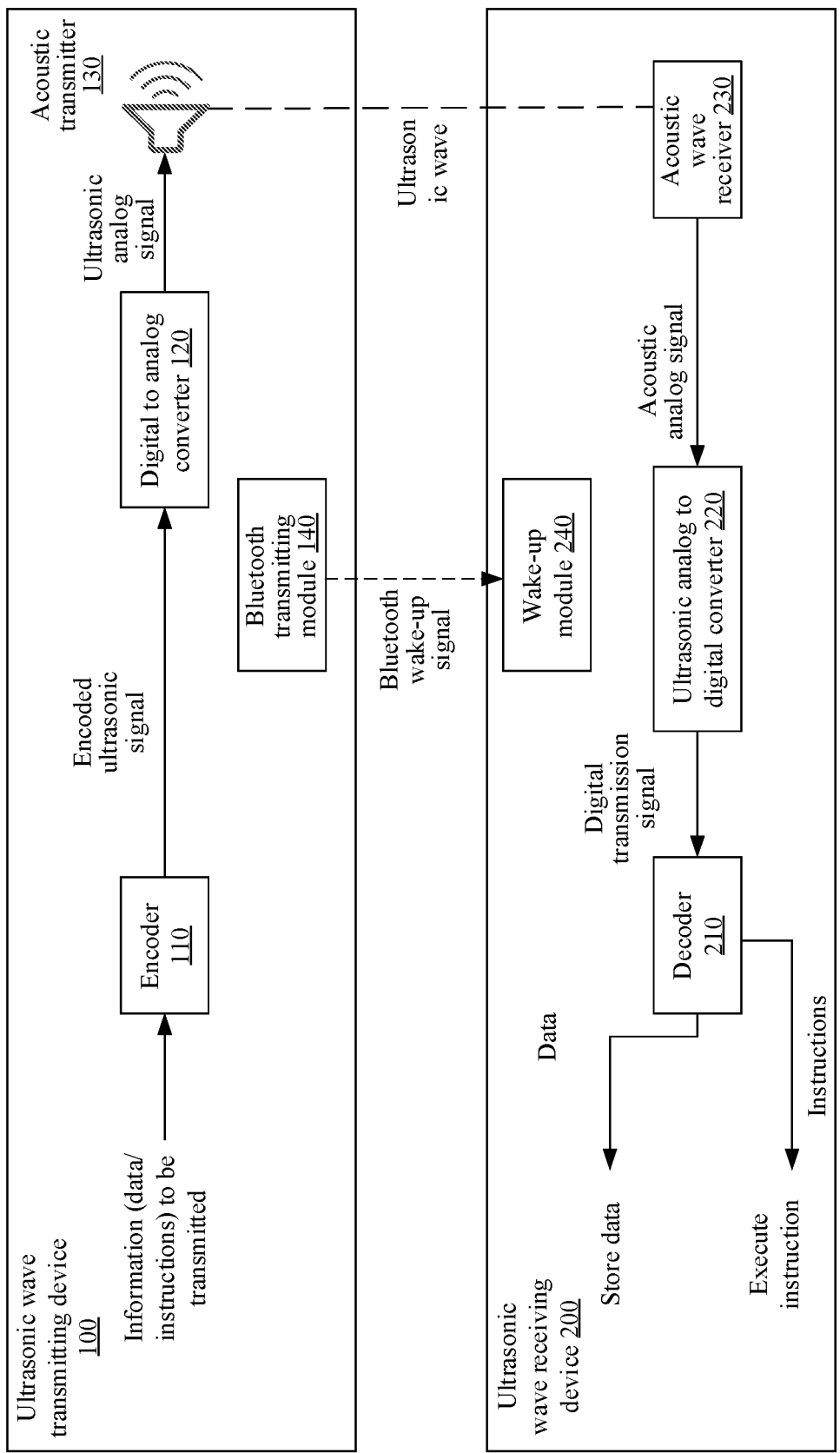
FIG. 2 is a schematic diagram of an ultrasonic wave transmitting device and an ultrasonic wave receiving device according to at least some examples.

FIG. 1 is a flow chart of an information transmission method according to at least some examples. As illustrated in FIG. 1, the information transmission method 10 may be applied to an ultrasonic wave transmitting device 100. As illustrated in FIG. 2, the ultrasonic wave transmitting device 100 may include an encoder 110 configured to encode information; a digital-to-analog converter (DAC) 120 configured to convert a digital signal into an analog signal; an acoustic transmitter 130 configured to transmit an ultrasonic wave, which may be a speaker, a loudspeaker or the like; and a Bluetooth transmitting module 140 capable of transmitting a Bluetooth signal. Correspondingly, the ultrasonic wave receiving device 200 may include an acoustic wave receiver 230 configured to receive the ultrasonic wave, such as a microphone; an ultrasonic analog-to-digital converter (ADC) 220 configured to convert an ultrasonic analog signal into a digital signal; a decoder 210 configured to convert the digital signal into original information; and a wake-up module 240, which may receive a Bluetooth wake-up signal and make a response to wake up the acoustic wave receiver 230 or other elements of the ultrasonic wave receiving device 200.

The information transmission method 10 at least includes step S11, step S12 and step S13. Step S11, step S12 and step S13 are described below in detail.

In Step S11, a Bluetooth wake-up signal is transmitted. The Bluetooth wake-up signal is configured to wake up an ultrasonic wave receiving device to receive an ultrasonic transmission signal.

In the example of the disclosure, in order to reduce the power consumption of the ultrasonic wave receiving device, the element for acquiring the ultrasonic wave or other elements of the ultrasonic wave receiving device are all in the normally-off state; and when the ultrasonic information transmission needs to be performed, related elements of the ultrasonic wave receiving device may be waked up through the Bluetooth wake-up signal. In the example of the disclosure, the control may be performed based on a user instruction or when the device needs to transmit the information, such that the ultrasonic wave transmitting device transmits the Bluetooth wake-up signal. With the method in the example of the disclosure, the ultrasonic wave receiving device may maintain the Bluetooth module in the turned on state, and may wake up, when receiving the Bluetooth wake-up signal, or receiving the Bluetooth wake-up signal and meeting a certain condition, the related element to perform ultrasonic data transmission.

In Step S12, an ultrasonic transmission signal is obtained based on information to be transmitted.

The information to be transmitted may be data information that needs to be transmitted, and alternatively, may be text information that needs to be transmitted. The information to be transmitted is composed of characters. Further, the information to be transmitted is composed of more than one character arranged in sequence. For example, the information to be transmitted may be a payment identity document (ID) on the payment page, may be a service set identifier (SSID) on the wireless fidelity (WIFI) page, or further, may be an instruction to be executed, etc. In the example of the disclosure, different types of information to be transmitted may be converted into the analog signal in the form of an ultrasonic wave based on the user instruction, or when the ultrasonic information needs to be transmitted.

In Step S13, the ultrasonic transmission signal is transmitted to an ultrasonic wave receiving device.

The information that needs to be transmitted is transmitted in an ultrasonic manner through the element such as the speaker and the loudspeaker. The short distance transmission is implemented. Furthermore, with the method in the example of the disclosure, the element of the ultrasonic wave receiving device, such as the acoustic wave receiver for receiving the ultrasonic signal, may be waked up through the Bluetooth wake-up signal, and thus, it is not needed that all elements of the ultrasonic wave receiving device 200 maintain the turned on state, thereby saving the power consumption under normal conditions.

In an example, the Bluetooth wake-up signal carries a device identifier of the ultrasonic wave transmitting device, such as a universally unique identifier (UUID) of the device, and is configured to enable the ultrasonic wave receiving device to determine the ultrasonic wave transmitting device based on the device identifier. With the method in the example, the ultrasonic wave receiving device 200 may identify whether the received Bluetooth signal is from the ultrasonic wave transmitting device 100, and may, for example, perform settings in advance. The device identifier of the ultrasonic wave transmitting device 100 is pre-stored in the ultrasonic wave receiving device 200, and upon the reception of the Bluetooth signal, the wake-up may be performed or the next step of determination may be entered when the Bluetooth signal includes the device identifier and the device identifier corresponds to the ultrasonic wave transmitting device 100.

In an example, step S11 may include transmitting a Bluetooth wake-up signal based on a preset RSSI. In the example, the ultrasonic wave transmitting device 100 may transmit the Bluetooth wake-up signal based on the preset RSSI through the Bluetooth transmitting module 140. In some cases, whether the corresponding element of the ultrasonic wave receiving device 200 is waked up may be determined according to the RSSI of the Bluetooth wake-up signal received by the ultrasonic wave receiving device 200. Generally, the RSSI of the Bluetooth signal is negatively correlated with the distance, i.e., the smaller the distance, the larger the RSSI received by the receiver (i.e., the ultrasonic wave receiving device 200) when the RSSI transmitted by the transmitter (i.e., the ultrasonic wave transmitting device 100) is unchanged. Therefore, the wake-up may be performed when the RSSI is greater than or equal to a strength threshold, such that the transmission stability of some transmission scenarios may be achieved; and it may be further ensured that in the scenario such as the payment scenario, the ultrasonic function may be waked up when the mobile phone which serves as the receiver gets close to the checkout device which serves as the transmitter, and the payment is accomplished through the information transmission corresponding to the ultrasonic, thereby achieving the security of payment. In some other examples, the determination may be alternatively made according to a change in the RSSI, such that the wake-up may be performed after the receiver completes some actions (such as, getting close, getting away and then getting close to the transmitter) to determine through the action of the receiver. For example, in some scenarios such as the foregoing payment scenario, it may be needed that the ultrasonic function may be waked up after the mobile phone which serves as the receiver performs a particular action and the user holds the mobile phone and completes the particular action. Through the information transmission corresponding to the ultrasonic, such as the transmission of the payment ID for the payment, the payment is completed and the security of payment is ensured. The confirmation before the payment may be performed through the action, such that the secure payment is implemented without scanning a code. Therefore, in order to achieve the reliability of the determination of the ultrasonic wave receiving device 200, it is needed to maintain stable the strength of the Bluetooth wake-up signal transmitted from the ultrasonic wave transmitting device 100. and the Bluetooth wake-up signal may be transmitted stably based on the preset RSSI.

In some examples, step S11 may further include: transmitting, based on preset time, the Bluetooth wake-up signal within the preset time continuously; and/or transmitting periodically the Bluetooth wake-up signal based on a preset number of times. In the example, the ultrasonic wave transmitting device 100 may transmit the Bluetooth wake-up signal in a variety of manners through the Bluetooth transmitting module 140.

In some cases, based on the preset time, the Bluetooth wake-up signal may be continuously transmitted within the preset time, such that the ultrasonic wave transmitting device 100 may wait for the wake-up of the ultrasonic wave receiving device 200. For example, the ultrasonic wave receiving device 200 is not within a range presently, and the user is needed to get the ultrasonic wave receiving device 200 close to the ultrasonic wave transmitting device 100. For example, in the payment scenario, the ultrasonic wave transmitting device 100 may enable a payment mode, continuously transmit the Bluetooth wake-up signal, and wait for the ultrasonic wave receiving device 200 to get close. After the ultrasonic wave receiving device 200 gets close, the ultrasonic wave receiving device 200 receives the Bluetooth wake-up signal, wakes up related elements of the ultrasonic wave receiving device 200 and receives ultrasonic information such as the payment ID to complete the payment, thereby implementing the secure payment without scanning the code. After the preset time, the ultrasonic wave transmitting device 100 may stop transmitting the Bluetooth wake-up signal, and may further stop transmitting the ultrasonic signal at the same time.

In some other cases, the Bluetooth wake-up signal may be periodically transmitted based on the preset number of times. Such a case is similar to the previous case. Through periodically transmitting the Bluetooth wake-up signal, the ultrasonic wave transmitting device 100 waits for the wake-up of the ultrasonic wave receiving device 200, such that the power consumption of the ultrasonic wave transmitting device 100 is reduced to some extent. After the preset number of times, the ultrasonic wave transmitting device 100 may stop transmitting the Bluetooth wake-up signal, and may further stop transmitting the ultrasonic signal at the same time.

In still some other cases, the Bluetooth wake-up signal may be periodically transmitted based on the preset number of times, and the duration for transmitting the signal each time is preset time. Such a case is similar to the foregoing two cases in principle, and the ultrasonic wave transmitting device 100 waits for the wake-up of the ultrasonic wave receiving device 200.

The technical solutions provided in the examples of the disclosure may achieve the following beneficial effects: in the ultrasonic wave receiving device, such elements as the decoder and acoustic wave receiver may be in a normally-off state. When it is needed to transmit information through the ultrasonic, the ultrasonic wave transmitting device first transmits the Bluetooth wake-up signal; and upon the reception of the Bluetooth wake-up signal, the ultrasonic wave receiving device wakes up related elements to receive the ultrasonic signal, thereby implementing the information transmission. Therefore, it is ensured that the ultrasonic wave receiving device may timely acquire and decode the ultrasonic signal, and the related elements in the ultrasonic wave receiving device need not to stay in a working state all the time, thereby reducing the power consumption of the ultrasonic wave receiving device, and improving the user experience.

Figure 3:
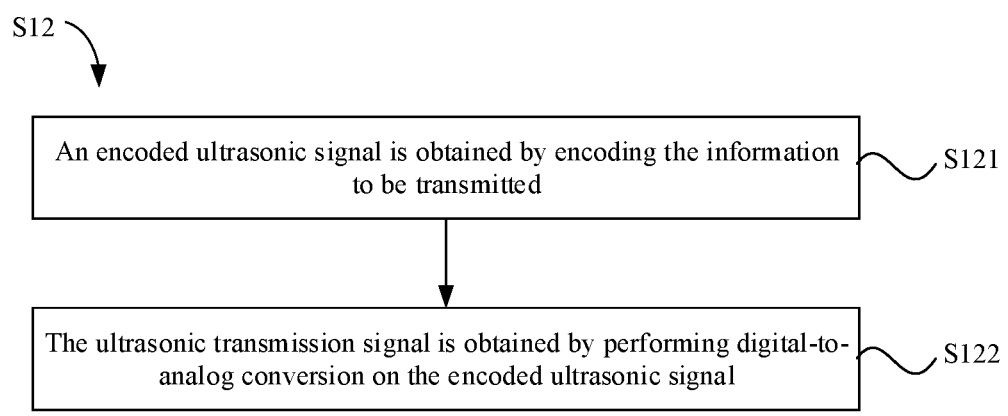
FIG. 3 is a flow chart of obtaining an ultrasonic transmission signal according to at least some examples.

In some examples, as illustrated in FIG. 3, step S12 may include: step S121, obtaining an encoded ultrasonic signal by encoding the information to be transmitted; and step S122, obtaining the ultrasonic transmission signal by performing a digital-to-analog conversion on the encoded ultrasonic signal. With the method in the example, the ultrasonic wave transmitting device 100 may convert the information to be transmitted into the encoded signal through the encoding of the encoder 11, and then convert the encoded signal into the analog signal through a DAC 120; and thus the analog signal may be transmitted through the acoustic transmitter 130.

Figure 4:
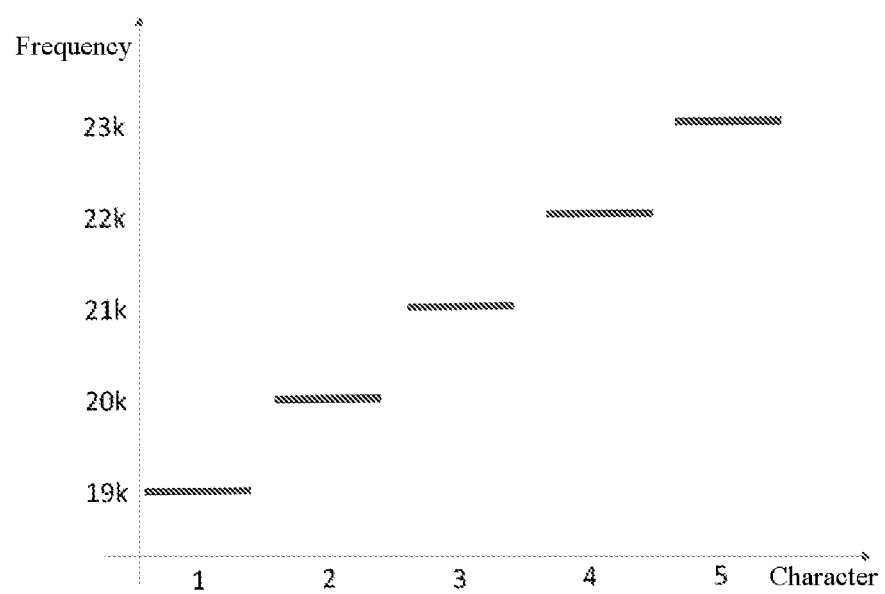
FIG. 4 is a schematic diagram of a corresponding relationship between a character and an encoded subsignal according to at least some examples.

In the example of the disclosure, the ultrasonic transmission signal may be transmitted at an ultrasonic frequency of 15 kHz to 25 kHz. FIG. 4 is a schematic diagram of a corresponding relationship between a character and an encoded subsignal according to at least some examples.

As illustrated in FIG. 4, in at least some examples of the disclosure, the information to be transmitted includes more than one character arranged in sequence. Step S121 may include:

converting the more than one character into more than one frequency value in sequence based on correspondences between the characters and the frequency values;

obtaining encoded subsignals corresponding to the characters based on the more than one frequency value; and encoding the encoded subsignals corresponding to the more than one character in sequence to form the encoded ultrasonic signal.

In order to convert the information to be transmitted into a signal that may be transmitted by means of an ultrasonic wave, it is needed to convert the information to be transmitted into a signal in the form of an ultrasonic wave. As the information to be transmitted includes more than one character arranged in sequence, each character in the information to be transmitted may be converted into an encoded subsignal at a particular frequency in the form of an ultrasonic wave; and then, the more than one converted encoded subsignal are arranged in sequence to form the encoded ultrasonic signal.

In at least some examples of the disclosure, converting the more than one character into more than one frequency value in sequence based on correspondences between the characters and the frequency values may be implemented in the following manner:

converting the more than one character in sequence into digits based on a corresponding relationship between a character and a digit; and converting more than one digit in sequence into more than one frequency value based on a corresponding relationship between the digits and the frequency values.

Since the characters in the information to be transmitted may be digits, texts or letters, the corresponding relationship between the characters and the digits may be predetermined. For example, the characters may be converted into corresponding N-nary digital information.

In an example, the characters may be converted into corresponding N-nary digital information according to an American Standard Code for Information Interchange (ASCII) code table. For example, the text "a" may be converted into digital information such as 97 (N=10), 61 (N=16), and 141 (N=8).

Further, the N-nary digital information is then converted according to the predetermined corresponding relationship between the digits and the frequency values, mapping the digits to specific encoded frequencies, so as to obtain corresponding frequency information.

In another example, a character-frequency corresponding table may be generated according to the predetermined corresponding relationship between the digits and the frequency values, mapping directly the characters to specific encoded frequencies, so as to obtain the corresponding frequency information.

For example, the character 1 corresponds to the specific frequency 19 kHz; the character 2 corresponds to the specific frequency 20 kHz; the character 3 corresponds to the specific frequency 21 kHz; the character 4 corresponds to the specific frequency 22 kHz; and the character 5 corresponds to the specific frequency 23 kHz, etc.

In another example, the character a corresponds to the specific frequency 29 kHz; the character b corresponds to the specific frequency 30 kHz; and the character c corresponds to the specific frequency 31 kHz, etc.

In the disclosure, the frequency values corresponding to the characters may be adjusted according to an actual condition. There are no specific limits made on the correspondences between the characters and the frequency values in the disclosure.

In an example, based on sinusoidal excitation, corresponding acoustic signals in the form of an ultrasonic wave, i.e., encoded subsignals, are generated from the converted frequency information, thereby implementing the converting of the characters into the encoded subsignals and the arranging of the encoded subsignals in sequence to obtain the encoded signal. The encoded signal corresponds to the information to be transmitted formed by the more than one character in sequence.

In an example, for each frequency corresponding to the frequency information, a corresponding acoustic signal in the form of an ultrasonic wave may be generated according to the following formula:

$$y=\sin(2\pi\omega t)$$

Here, y is an obtained acoustic signal, $\omega$ is one frequency corresponding to the frequency information, and t is a duration vector.

When the decoding device in the ultrasonic wave receiving device has a frame length of L sampling points, the length of t needs to be greater than k*L. Here, k is an anti-noise coefficient, and for example, k may be 3. Through setting t to be greater than k*L, the case that the data information to be transmitted is missed due to an acoustic signal too short to be captured effectively by the decoding device may be avoided.

In at least some examples of the disclosure, the more than one encoded subsignal may be arranged in sequence, to obtain the encoded ultrasonic signal. The order arranged in sequence refers to an arrangement order with which the more than one character are arranged in sequence to form the information to be transmitted.

When adjacent encoded subsignals have the same frequency during the arrangement, the adjacent encoded subsignals are directly connected to obtain the encoded ultrasonic signal; and when the adjacent encoded subsignals have different frequencies during the arrangement, the adjacent encoded subsignals are connected in a frequency shift manner to obtain the encoded ultrasonic signal.

Through connecting different encoded subsignals in the frequency shift manner to form the encoded ultrasonic signal, the encoded ultrasonic signal formed through the connection shortens the duration of transmitting the whole encoded ultrasonic signal, and improves the signal transmission efficiency on the premise of not generating the noise audible to the human ear.

In an example, when the frequencies corresponding to the encoded subsignals connected in the frequency shift manner are respectively $f_0$ and $f_1$, and the duration of frequency shift is N sampling points, the frequency shift manner may be implemented according to the following formula:

$$y = \sin(2\pi(f_0 + kt)t) \quad t = 0, 1, \cdots (N-1), \text{ or}$$

$$y = \sin\left(\frac{2\pi(f_0 + k^t)}{\log k}\right) \quad t = 0, 1, \cdots (N-1)$$

Where, y is an acoustic signal at the connection position, k is a frequency shift rate, and $$k = \frac{(f_1 - f_0)}{N}.$$

In at least some examples of the disclosure, encoding the encoded subsignals corresponding to the more than one character in sequence to form the encoded ultrasonic signal further may be implemented in the following manner:

adding fade-in before an encoded subsignal corresponding to a first character, and adding fade-out after an encoded subsignal corresponding to a last character to form the encoded ultrasonic signal.

The fade-in may be added through a linear interpolation, or an exponent interpolation, etc., which is not specifically limited in the disclosure.

The fade-out may be added through a linear interpolation, or an exponent interpolation, etc., which is not specifically limited in the disclosure.

Figure 5:
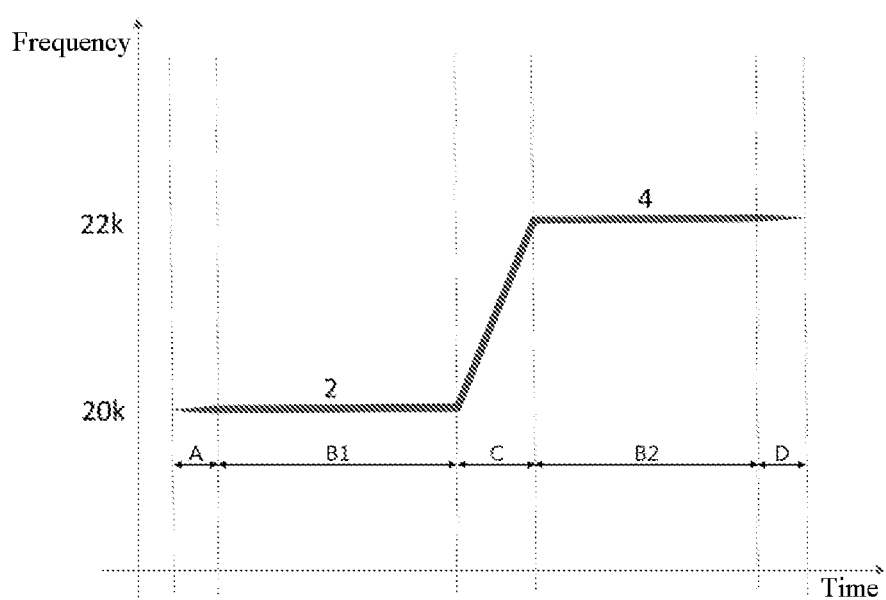
FIG. 5 is a schematic diagram of an encoded ultrasonic signal according to at least some examples.

FIG. 5 is a schematic diagram of an encoded ultrasonic signal according to at least some examples.

As illustrated in FIG. 5, in an example, FIG. 5 shows an encoded ultrasonic signal which is connected in a frequency shift manner, and is formed by adding fade-in before an encoded subsignal corresponding to a first character, and adding fade-out after an encoded subsignal corresponding to a last character.

Here, A represents the fade-in added; B1 represents an encoded subsignal obtained through encoding the character 2; B2 represents an encoded subsignal obtained through encoding the character 4; C represents the processing of frequency shift for connecting the encoded subsignal B1 and the encoded subsignal B2; and D represents the fade-out added.

In at least some examples of the disclosure, step S13 may include: transmitting the ultrasonic transmission signal to the ultrasonic wave receiving device in a preset interval.

The preset interval may be adjusted according to an actual condition. There are no specific limits made on the preset interval in the disclosure.

In an example, before an external instruction for stopping transmitting the ultrasonic transmission signal is received, the ultrasonic transmission signal may be repeatedly transmitted. A certain delay may be added between two ultrasonic transmission signals that are repeatedly transmitted. The duration of the delay may be greater than k times of the frame length of the decoding device in the ultrasonic wave receiving device. Here, k is an anti-noise coefficient. In an example, k may be 3. In such a manner, the case that the ultrasonic transmission data information is missed due to an ultrasonic transmission signal too short to be captured effectively by the decoding device may be avoided.

Figure 6:
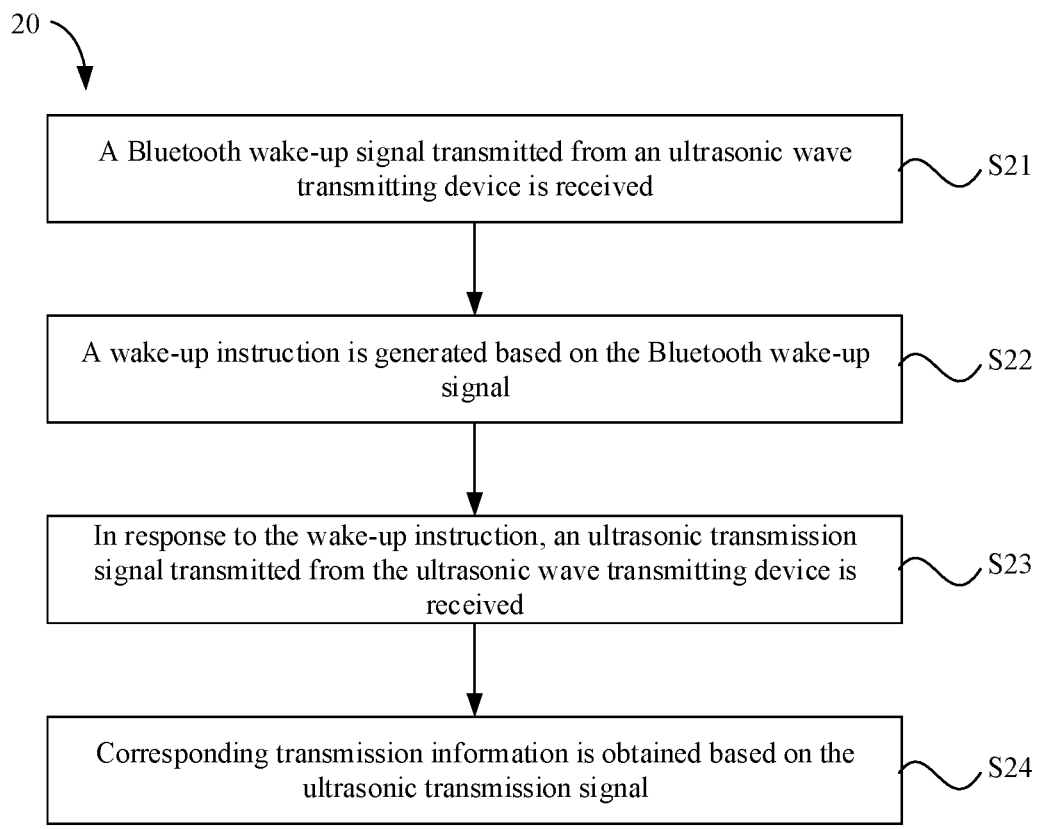
FIG. 6 is a flow chart of another information transmission method according to at least some examples.

Based on the same concept, a second aspect of the disclosure further provides another information transmission method 20. FIG. 6 is a flow chart of another information transmission method according to at least some examples. The information transmission method 20 may be applied to the ultrasonic wave receiving device 200 illustrated in FIG. 2. The information transmission method 20 may at least include step S21, step S22, step S23 and step 24.

In Step S21, a Bluetooth wake-up signal transmitted from an ultrasonic wave transmitting device is received.

In Step S22, a wake-up instruction is generated based on the Bluetooth wake-up signal.

In Step S23, in response to the wake-up instruction, an ultrasonic transmission signal transmitted from the ultrasonic wave transmitting device is received.

In Step S24, corresponding transmission information is obtained based on the ultrasonic transmission signal.

The wake-up module 240 of the ultrasonic wave receiving device 200 receives the Bluetooth signal, and may generate the wake-up instruction upon the reception of the Bluetooth wake-up signal transmitted from the ultrasonic wave transmitting device 100. Through waking up the ultrasonic acquisition assembly of the ultrasonic wave receiving device 200, the ultrasonic wave receiving device 200 receives the ultrasonic transmission signal transmitted from the ultrasonic wave transmitting device 100. The ultrasonic acquisition assembly may at least include the acoustic wave receiver 230. One or more of the acoustic wave receiver 230, the ultrasonic ADC 220 and the decoder 210 of the ultrasonic wave receiving device 200 which are turned off in a normal state may be waked up, such that the ultrasonic wave receiving device 200 may receive the ultrasonic transmission signal in the form of an ultrasonic wave through the acoustic wave receiver 230 such as the microphone, and may further obtain, based on the ultrasonic transmission signal, the corresponding transmission information such as the corresponding data or corresponding instruction.

In such a manner, some elements in the ultrasonic wave receiving device 200 may not have to stay in the working state all the time under the premise that the ultrasonic wave receiving device 200 receives and decodes the ultrasonic wave timely, thereby reducing the power consumption of the ultrasonic wave receiving device 200, and improving the user experience.

Figure 7:
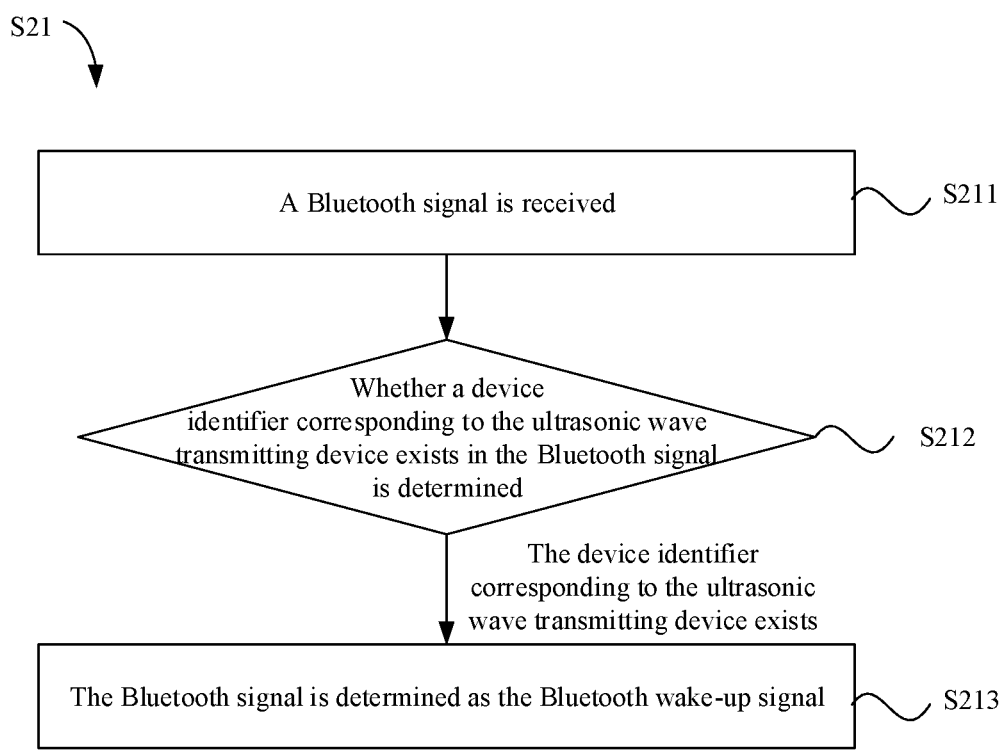
FIG. 7 is a flow chart of determining a Bluetooth wake-up signal according to at least some examples.

In an example, as illustrated in FIG. 7, step S21 may include: step S211, receiving a Bluetooth signal; step S212, determining whether a device identifier corresponding to the ultrasonic wave transmitting device exists in the Bluetooth signal; when the device identifier corresponding to the ultrasonic wave transmitting device exists, the method proceeds to step S213, determining the Bluetooth signal as the Bluetooth wake-up signal. In the example, the ultrasonic wave receiving device 200 receives the Bluetooth signal through the wake-up module 240, and may determine, upon the reception of the Bluetooth signal, whether the device identifier exists and whether the existing device identifier corresponds to the pre-matched ultrasonic wave transmitting device 100. When the device identifier corresponds to the ultrasonic wave transmitting device 100, the wake-up may be performed to complete the transmission of the ultrasonic information. In such a manner, the identity verification may be performed so as to avoid receiving information that should not be received, or avoid unnecessary wake-up, to ensure the security of the data.

In an example, step S22 may include: detecting a received signal strength indication (RSSI) of the Bluetooth wake-up signal in response to the Bluetooth wake-up signal; and generating the wake-up instruction when the RSSI is greater than or equal to a strength threshold, and/or when a change of the RSSI meets a preset condition. As previously mentioned, in some cases, whether the corresponding element of the ultrasonic wave receiving device 200 is waked up may be determined according to the RSSI of the Bluetooth wake-up signal received by the ultrasonic wave receiving device 200. The RSSI received by the receiver (i.e., the ultrasonic wave receiving device 200) is larger when the RSSI transmitted by the transmitter (i.e., the ultrasonic wave transmitting device 100) is unchanged. Therefore, the wake-up may be performed when the RSSI is greater than or equal to a strength threshold, such that the transmission stability of some transmission scenarios may be achieved; and it may be further ensured that in the scenario such as the payment scenario, the ultrasonic function may be waked up when the mobile phone which serves as the receiver gets close to the checkout device which serves as the transmitter, and the payment is accomplished through the information transmission corresponding to the ultrasonic, thereby achieving the security of payment. In some other examples, the determination may be alternatively made according to whether the change in the RRSI meets a preset condition, such that the receiver may complete some actions. For example, the preset condition of the RRSI may be that: the RRSI is greater than or equal to a first threshold (the receiver gets close to the transmitter), then the RRSI is less than or equal to a second threshold (the receiver is away from the transmitter), and the RRSI is greater than or equal to a third threshold (the receiver gets close to the transmitter again). The first threshold may be equal to the third threshold, and both the first threshold and the third threshold are greater than the second threshold. Through meeting a certain condition and then performing the wake-up, the determination may be made through the action of the receiver. For example, in some scenarios such as the foregoing payment, it may be needed that the ultrasonic function may be waked up after the mobile phone which serves as the receiver performs some particular actions and the user holds the mobile phone to complete the particular action. Through the information transmission corresponding to the ultrasonic, such as the transmission of the payment ID for the payment, the payment is completed and the security of payment is ensured. The confirmation before the payment may be performed through the action, such that the secure payment is implemented without scanning a code. The preset condition may be set according to an actual need, or different preset conditions may be set according to different transmission contents, such that the receiving object meeting the corresponding preset condition is waked up.

Figure 8:
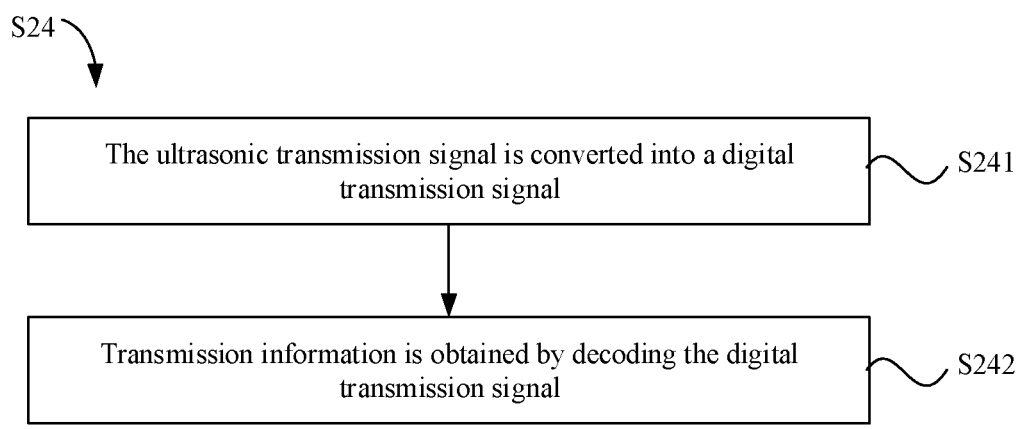
FIG. 8 is a flow chart of obtaining transmission information according to at least some examples.

In some examples, as illustrated in FIG. 8, step S24 may include: step S241, converting the ultrasonic transmission signal into a digital transmission signal; and step S242, obtaining the transmission information by decoding the digital transmission signal. In the example, in step S241, the ultrasonic transmission signal which is an analog signal may be converted into a digital transmission signal in a digital signal mode by the ultrasonic ADC 220 of the ultrasonic wave receiving device 200. The ADC 220 may convert the ultrasonic transmission signal into the digital transmission signal at a preset sampling rate. The preset sampling rate may be a high sampling rate, and may be greater than or equal to 100000 Hz. The preset sampling rate may be further adjusted according to an actual condition, such as 44100 Hz, 48000 Hz or 96000 Hz. In the disclosure, the preset sampling rate needs to be higher than the possible maximum frequency value corresponding to the encoded ultrasonic signal, such that the encoded ultrasonic signal may be accurately and completely sampled. There are no specific limits made on the specific frequency of the preset sampling rate. Furthermore, the ultrasonic ADC 220 of the ultrasonic wave receiving device 200 in the example of the disclosure may be in a turned off state to reduce the power consumption. In step S242, the digital signal may be converted into the transmission information by the decoder 210 of the ultrasonic wave receiving device 200. The transmission information is the information which is intentionally transmitted by the ultrasonic wave transmitting device 100.

Since the ultrasonic ADC 220 uses the high sampling rate, it may be ensured that the ultrasonic transmission signal may be completely received without missing the ultrasonic transmission signal, thereby laying a foundation for subsequent and complete decoding of the encoded ultrasonic signal to obtain the complete transmission information.

Furthermore, the ultrasonic ADC 220 uses a high sampling rate, and thus has a relatively large power consumption. Therefore, in order to ensure the battery life of the ultrasonic wave receiving device, the ultrasonic ADC 220 is not in the turned on state all the time, but is turned on when the ultrasonic ADC 220 is needed to work.

In at least some examples of the disclosure, the encoded ultrasonic signal includes more than one encoded subsignal arranged in sequence. Step S242, i.e., obtaining the transmission information by decoding the digital transmission signal, may be implemented in the following manner:

obtaining more than one character corresponding to the more than one encoded subsignal by decoding the more than one encoded subsignal in sequence; and forming the transmission information with the more than one character arranged in sequence.

The order for decoding the encoded ultrasonic signal is started from the first encoded subsignal of the encoded ultrasonic signal and ended at the last encoded subsignal of the encoded ultrasonic signal. The first encoded subsignal corresponds to the first character in the transmission information, and the last encoded subsignal corresponds to the last character in the transmission information. Therefore, in application, the more than one encoded subsignal may be decoded in sequence according to a chronological order, i.e., the more than one encoded subsignal may be decoded in sequence as more than one character, and the more than one decoded character are arranged to form the transmission information according to the decoding order.

In at least some examples of the disclosure, decoding the more than one encoded subsignal in sequence to obtain the more than one character corresponding to the more than one encoded subsignal may be implemented as follows:

obtaining enframed data corresponding to the digital transmission signal by enframing the digital transmission signal;

obtaining frequency domain information of the enframed data by performing a Fourier Transform (FT) on the enframed data;

computing a power of the enframed data at an encoding frequency point based on the frequency domain information, in which the encoding frequency point is obtained through performing the FT based on a frequency corresponding to the character; and determining the more than one character corresponding to the more than one encoded subsignal in sequence based on the power of the enframed data at the encoding frequency point.

In an example, decoding the encoded subsignals in sequence may be implemented as follows.

The digital transmission signal is set as y(n), n is a time series of an input signal after the sampling of the ultrasonic signal ADC, and the sampling rate is FS. The FS may be 8000 Hz or 16000 Hz.

Through enframing, the y(n) may be segmented into enframed data $y_1, y_2 \ldots y_k$ according to the frame length L. Here, k is a serial number of the frame.

Each frame of data is windowed to obtain windowed frame data, i.e., the enframed data $y_{w1}, y_{w2} \ldots y_{wk}$. The enframed data may be determined according to the following formula:

$$y_{wi} = \text{window}(x_i) \ (i=1, 2 \ldots k)$$

Here, Window represents a window function.

The FT is performed on the enframed data $y_{wi}$ that is subjected to the enframing, to obtain frequency domain information for each frame of data signal, i.e., the frequency domain information $Y_1, Y_2 \ldots Y_k$. The frequency domain information may be determined according to the following formula:

$$Y_i = FT(y_{wi}) \ (i=1, 2 \ldots k)$$

When the number of points for the FT is M, each $Y_i$ may be decomposed into M corresponding frequency points.

Further, the power of the enframed data at the encoding frequency point is computed based on the frequency domain information. The encoding frequency point b' is obtained through the FT based on the frequency f' (such as 19 kHz, 20 kHz, 21 kHz, 22 kHz or 23 kHz) corresponding to the character.

The encoding frequency point b' and the power P' are determined according to the following formula:

$$b' = \text{round}\left(\frac{f' * M}{FS}\right)$$

$$P' = \text{mod}(Y_i(b'))$$

In an example, the frequency f' selected from the character-frequency corresponding table is 19 kHz, the number M of points for the FT is 128, and the sampling rate FS of the ultrasonic signal ADC is 16000, b'=round(19000*128/16000)=152.

Additionally, the value of the $Y_i(152)$ is 0.225+0.108i, and the power P'=mod(0.225+0.108i)=0.2493.

Further, the more than one character corresponding to the more than one encoded subsignal are determined in sequence based on the power P' at the encoding frequency point of the enframed data.

Whether the computed power P' is greater than or equal to a power threshold Q' is determined. When the power P' is greater than or equal to the power threshold Q', and greater than the power computed based on the frequencies (20 kHz, 21 kHz, 22 kHz and 23 kHz) other than the selected frequency (19 kHz) in the character-frequency corresponding table, it is indicated that the ultrasonic transmission signal includes the encoded subsignal corresponding to the selected frequency (19 kHz).

In order to ensure the accuracy of determining, based the power P' of the enframed data, that the ultrasonic transmission signal includes the encoded subsignal corresponding to the frequency, the determination may be further made on continuous k frames of signals (the k is the anti-noise coefficient) as a variation. When the power P' of the continuous k frames of signals computed based on some frequencies in the character-frequency corresponding table is greater than or equal to the power threshold Q', and greater than the power computed based on the frequencies other than the selected frequency in the character-frequency corresponding table, it is indicated that the ultrasonic transmission signal includes the encoded subsignal corresponding to the frequency.

Further, according to the decoded encoded subsignal having the particular frequency and the character-frequency corresponding table, the character corresponding to the specific frequency is obtained.

In an example, in the character-frequency corresponding table, the character 1 corresponds to the specific frequency 19 kHz; the character 2 corresponds to the specific frequency 20 kHz; the character 3 corresponds to the specific frequency 21 kHz; the character 4 corresponds to the specific frequency 22 kHz; and the character 5 corresponds to the specific frequency 23 kHz. when the frequency of the decoded encoded subsignal is 19 kHz, the character corresponding to the encoded subsignal is 1.

The more than one encoded subsignal are decoded in sequence to obtain more than one character corresponding to the more than one encoded subsignal; and the transmission information are formed with the more than one character according to the order arranged in sequence.

In at least some examples of the disclosure, the transmission information is data or an instruction. The information transmission method may further include: storing the data or executing the instruction, based on the transmission information obtained through the decoding.

The data may be a text, a picture or other contents. After receiving and decoding the transmission information in the above-mentioned manner, the ultrasonic wave receiving device 200 may store the transmission information. For example, the ultrasonic wave receiving device 200 may store the transmission information locally or transmit the transmission information to a cloud terminal for storage. The instruction may be executed to open specific software or application; or to open a specific page; or to open a payment interface and perform a payment operation; or to transmit specific information back to the ultrasonic wave transmitting device 100 in the form of an ultrasonic wave; or connect, according to the password information on wifi or Bluetooth in the transmission information, corresponding wifi or Bluetooth devices and perform subsequent information transmission, etc.

Figure 9:
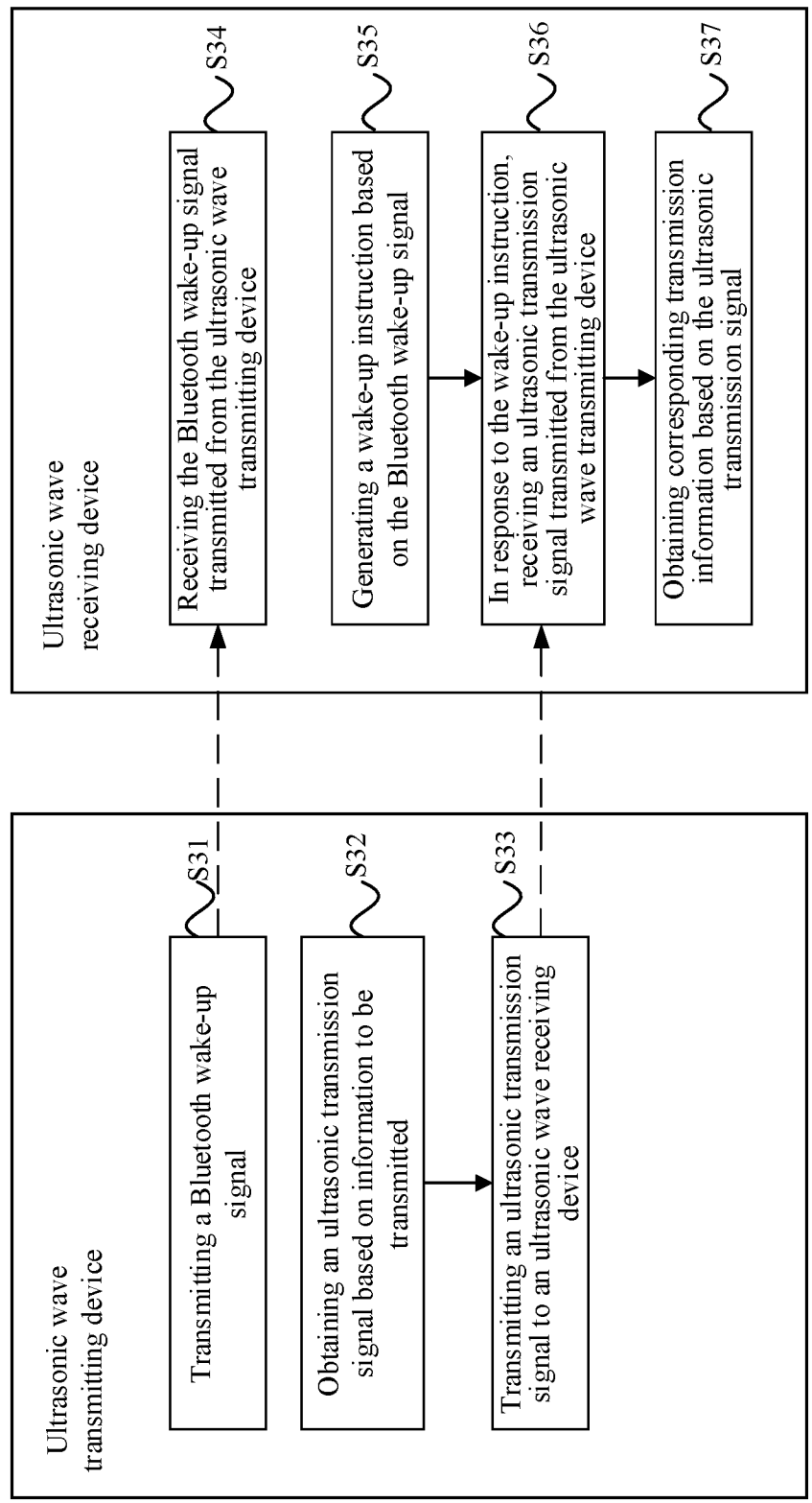
FIG. 9 is an schematic diagram of interaction of an information transmission method according to at least some examples.

FIG. 9 is an schematic diagram of interaction of an information transmission method according to at least some examples.

As illustrated in FIG. 9, in at least some examples of the disclosure, the interaction of the information transmission method may include the following steps.

In Step S31, an ultrasonic wave transmitting device 100 transmits a Bluetooth wake-up signal. The ultrasonic wave transmitting device 100 may transmit the Bluetooth wake-up signal in the form of broadcast.

In Step S32, the ultrasonic wave transmitting device 100 may obtain an ultrasonic transmission signal based on information to be transmitted.

In Step S33, the ultrasonic wave transmitting device 100 may transmit the ultrasonic transmission signal to an ultrasonic wave receiving device 200 in the form of a ultrasonic wave.

In Step S34, the ultrasonic wave receiving device 200 receives the Bluetooth wake-up signal transmitted from the ultrasonic wave transmitting device. The ultrasonic wave receiving device 200 may receive the Bluetooth wake-up signal transmitted from the ultrasonic wave transmitting device 200 in the form of broadcast.

In Step S35, the ultrasonic wave receiving device 200 generates a wake-up instruction based on the Bluetooth wake-up signal.

In Step S36, in response to the wake-up instruction, the ultrasonic wave receiving device 200 receives an ultrasonic transmission signal transmitted from the ultrasonic wave transmitting device 100. The ultrasonic wave receiving device 200 may receive, through waking up related elements, the ultrasonic wave transmitted from the ultrasonic wave transmitting device 100.

In Step S37, the ultrasonic wave receiving device 200 obtains corresponding transmission information based on the ultrasonic transmission signal.

Through the above-mentioned implementation manner, the elements of the ultrasonic wave receiving device 200 such as the decoder 210 may not have to stay in the working state all the time under the premise that the ultrasonic wave receiving device 200 may receive and decode the ultrasonic signal, thereby reducing the power consumption of the ultrasonic wave receiving device 200, and improving the user experience.

Based on the same concept, the example of the disclosure further provides an information transmission apparatus 300 applied to an ultrasonic wave transmitting device, and an information transmission apparatus 400 applied to an ultrasonic wave receiving device.

It is to be understood that in order to implement the above-mentioned functions, the information transmission apparatus 300 and the information transmission apparatus 400 provided in the examples of the disclosure include a corresponding hardware structure and/or software module for executing various functions. The examples of the disclosure may be implemented by hardware or a combination of hardware and computer software together with the units and algorithm steps of the various examples described in the examples disclosed herein. Whether a certain function is implemented in the form of hardware or in the form of computer software driven hardware depends on the specific applications and design constraint conditions of the technical solutions. Those skilled in the art may implement the described functions by using different methods for each specific application, but the implementation should not be considered beyond the scope of the disclosure.

Figure 10:
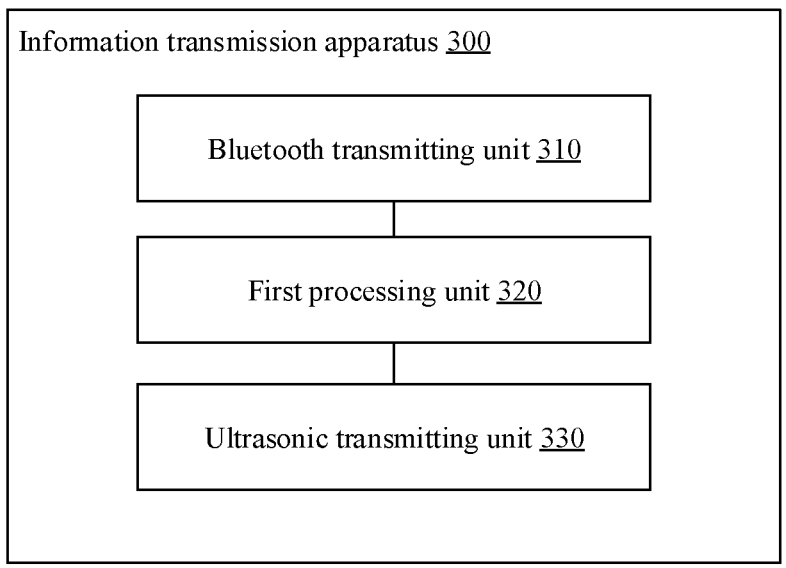
FIG. 10 is a block diagram of an information transmission apparatus according to at least some examples.

FIG. 10 is a block diagram of an information transmission apparatus 300 according to at least some examples.

As illustrated in FIG. 10, in at least some examples of the disclosure, the information transmission apparatus 300 may be applied to an ultrasonic wave transmitting device. The information transmission apparatus 300 may include: a Bluetooth transmitting unit 310, configured to transmit a Bluetooth wake-up signal; a first processing unit 320, configured to obtain an ultrasonic transmission signal based on information to be transmitted; and an ultrasonic transmitting unit 330, configured to transmit the ultrasonic transmission signal to an ultrasonic wave receiving device. Herein, the Bluetooth wake-up signal is configured to wake up the ultrasonic wave receiving device to receive the ultrasonic transmission signal.

In an example, the Bluetooth wake-up signal carries a device identifier of the ultrasonic wave transmitting device to enable the ultrasonic wave receiving device to determine the ultrasonic wave transmitting device based on the device identifier.

In an example, the Bluetooth transmitting unit 310 is configured to transmit the Bluetooth wake-up signal based on a preset RRSI.

In an example, the Bluetooth transmitting unit 310 is further configured to: transmit, based on preset time, the Bluetooth wake-up signal within the preset time continuously; and/or transmit periodically the Bluetooth wake-up signal based on a preset number of times.

Figure 11:
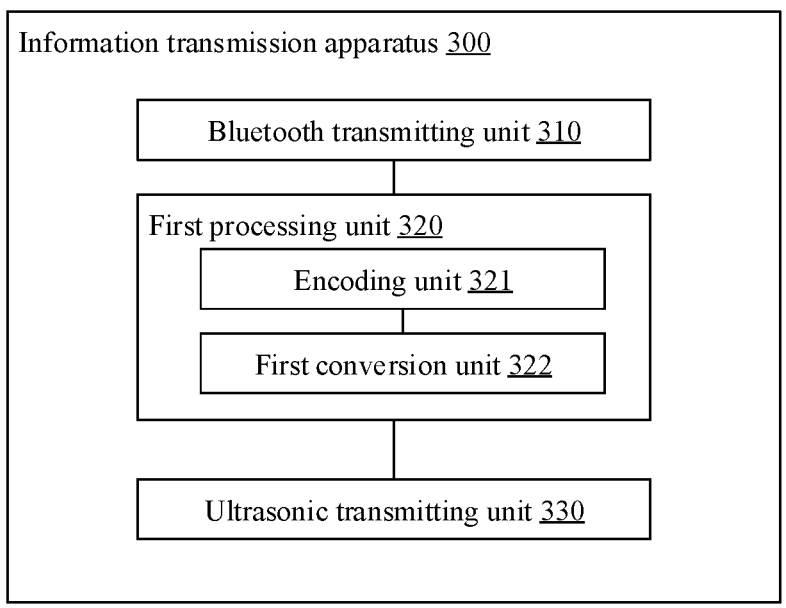
FIG. 11 is a block diagram of another information transmission apparatus according to at least some examples.

In an example, as illustrated in FIG. 11, the first processing unit 320 includes: an encoding unit 321, configured to obtain an encoded ultrasonic signal by encoding the information to be transmitted; and a first conversion unit 322, configured to perform digital-to-analog conversion on the encoded ultrasonic signal to obtain the ultrasonic transmission signal.

In an example, the information to be transmitted includes more than one character arranged in sequence; and the encoding unit 321 is configured to: convert the more than one character into more than one frequency value in sequence based on correspondences between the characters and the frequency values; obtain encoded subsignals corresponding to the characters based on the more than one frequency value; and encode the encoded subsignals corresponding to the more than one character in sequence to form the encoded ultrasonic signal.

In an example, the encoding unit 321 is further configured to: connect, when adjacent encoded subsignals have a same frequency, the adjacent encoded subsignals directly; and connect, when the adjacent encoded subsignals have different frequencies, the adjacent encoded subsignals in a frequency shift manner.

In an example, the encoding unit 321 is further configured to: add fade-in before an encoded subsignal corresponding to a first character, and adding fade-out after an encoded subsignal corresponding to a last character to form the encoded ultrasonic signal.

In an example, the ultrasonic transmitting unit 330 is configured to: transmit the ultrasonic transmission signal to the ultrasonic wave receiving device in a preset interval.

For the information transmission apparatus 300 in the above-mentioned example, how each module performs the operations specifically has been described in detail in the examples related to the methods, and is not elaborated herein.

Figure 12:
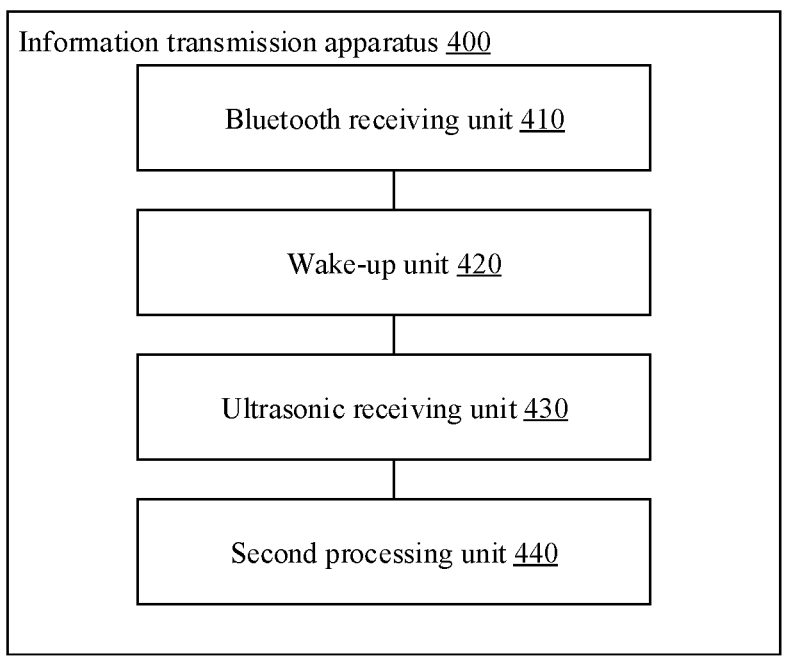
FIG. 12 is a block diagram of another information transmission apparatus according to at least some examples.

Based on the same concept, the examples of the disclosure further provide another information transmission apparatus 400. FIG. 12 is a block diagram of another information transmission apparatus 400 according to at least some examples. As illustrated in FIG. 12, in at least some examples of the disclosure, the information transmission apparatus 400 may be applied to an ultrasonic wave receiving device 200. The information transmission apparatus 400 may include: a Bluetooth receiving unit 410, configured to receive a Bluetooth wake-up signal transmitted from an ultrasonic wave transmitting device; a wake-up unit 420, configured to generate a wake-up instruction based on the Bluetooth wake-up signal; an ultrasonic receiving unit 430, configured to receive, in response to the wake-up instruction, an ultrasonic transmission signal transmitted from the ultrasonic wave transmitting device; and a second processing unit 440, configured to obtain corresponding transmission information based on the ultrasonic transmission signal.

In an example, the Bluetooth receiving unit 410 is configured to: receive a Bluetooth signal; determine whether a device identifier corresponding to the ultrasonic wave transmitting device exists in the Bluetooth signal; and determine the Bluetooth signal as the Bluetooth wake-up signal when the device identifier corresponding to the ultrasonic wave transmitting device exists.

In an example, the wake-up unit 420 is configured to: detect an RRSI of the Bluetooth wake-up signal in response to the Bluetooth wake-up signal; and generate the wake-up instruction when the RRSI is greater than or equal to a strength threshold, and/or when a change of the RRSI meets a preset condition.

In an example, the ultrasonic receiving unit 430 is configured to: receive, through waking up an ultrasonic acquisition assembly of the ultrasonic wave receiving device, the ultrasonic transmission signal transmitted from the ultrasonic wave transmitting device, in which the ultrasonic acquisition assembly at least includes an acoustic wave receiver.

Figure 13:
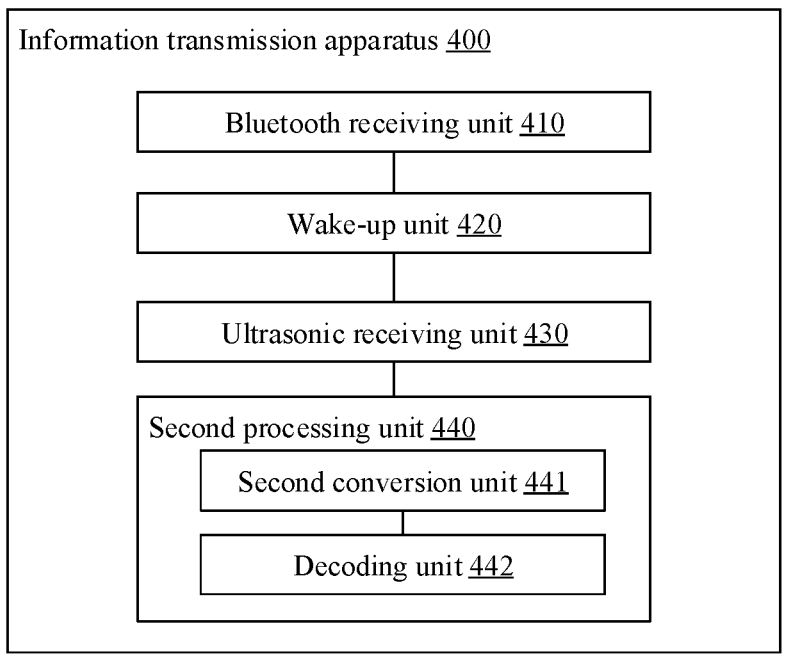
FIG. 13 is a block diagram of another information transmission apparatus according to at least some examples.

In an example, as illustrated in FIG. 13, the second processing unit 440 includes: a second conversion unit 441, configured to convert the ultrasonic transmission signal into a digital transmission signal; and a decoding unit 442, configured to obtain the transmission information by decoding the digital transmission signal.

In an example, the digital transmission signal includes more than one encoded subsignal arranged in sequence; and the decoding unit 442 is configured to: obtain more than one character corresponding to the more than one encoded subsignal by decoding the more than one encoded subsignal in sequence; and form the transmission information with the more than one character arranged in sequence.

In an example, the decoding unit 442 is further configured to: obtain enframed data corresponding to the digital transmission signal by enframing the digital transmission signal; perform a Fourier Transform on the enframed data to obtain frequency domain information of the enframed data; compute a power of the enframed data at an encoding frequency point based on the frequency domain information, in which the encoding frequency point is obtained through performing the FT based on a frequency corresponding to the character; and determine the more than one character corresponding to the more than one encoded subsignal in sequence based on the power of the enframed data at the encoding frequency point.

Figure 14:
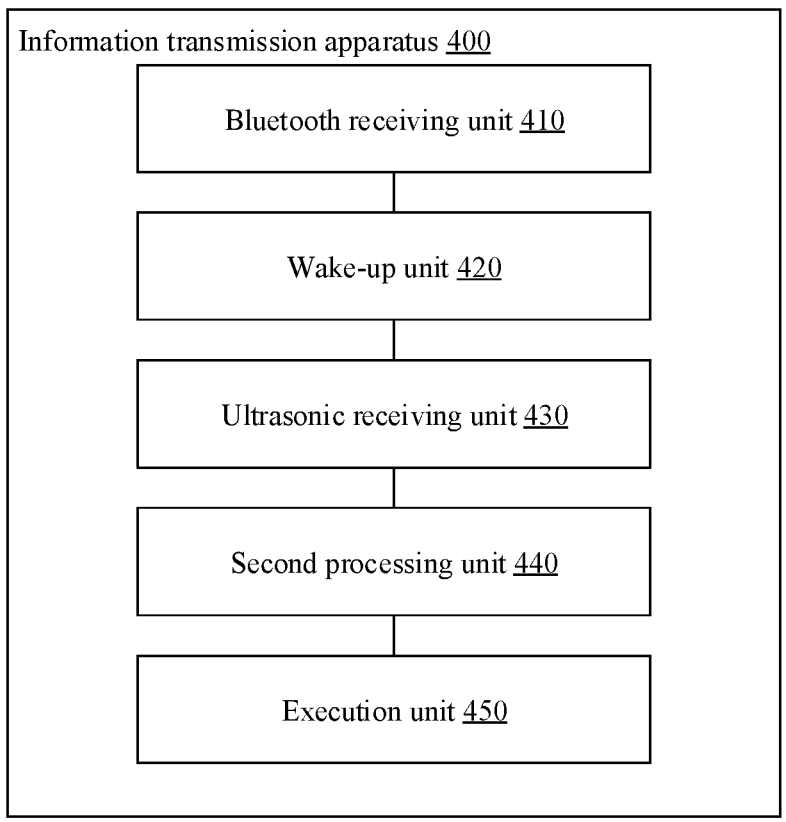
FIG. 14 is a block diagram of another information transmission apparatus according to at least some examples.

In an example, the transmission information is data or an instruction; and as illustrated in FIG. 14, the information transmission apparatus 400 further includes: an execution unit 450, configured to store the data or execute the instruction, based on the transmission information.

For the information transmission apparatus 400 in the above-mentioned example, how each module performs the operations specifically has been described in detail in the examples related to the methods, and is not elaborated herein.

Figure 15:
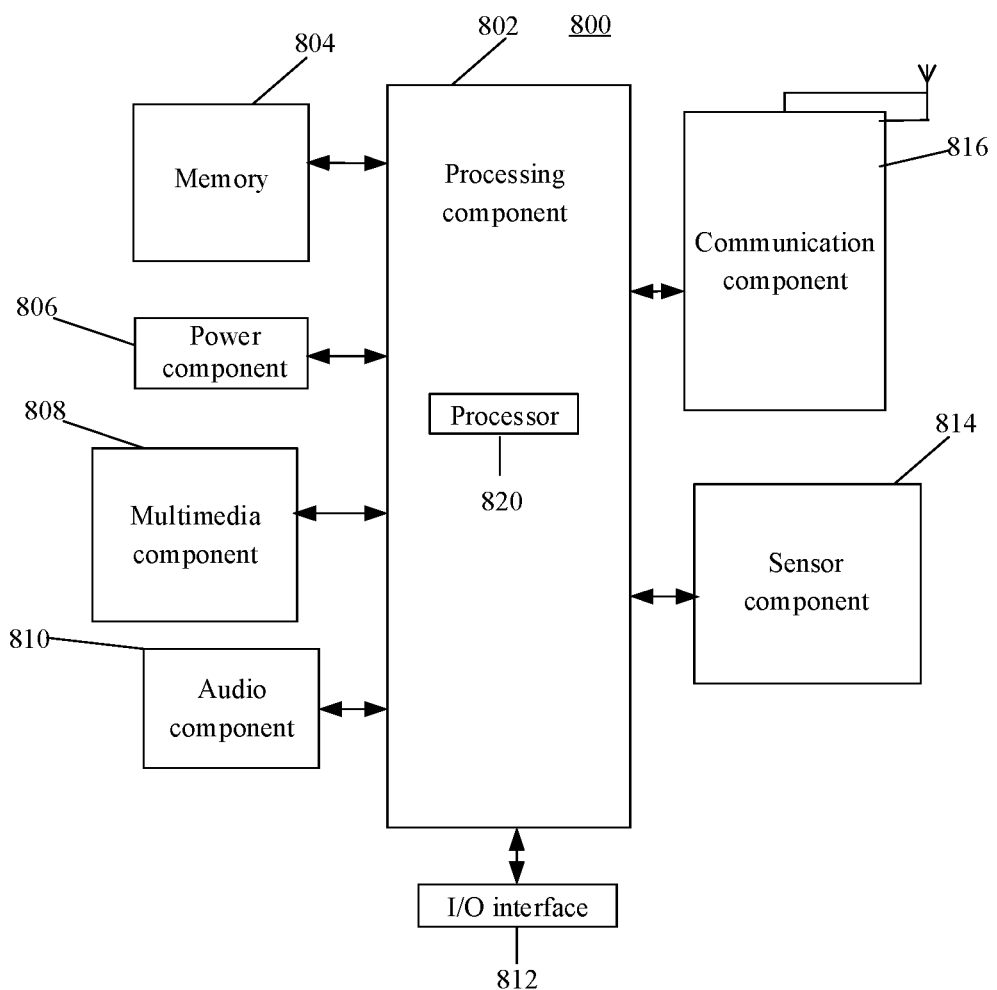
FIG. 15 is a block diagram of an information transmission apparatus according to at least some examples.

FIG. 15 is a block diagram of another information transmission apparatus according to at least some examples. For example, the information transmission apparatus 800 may be a mobile phone, a computer, a digital broadcast terminal, a messaging device, a game console, a tablet, a medical device, exercise equipment, a personal digital assistant or the like.

Referring to FIG. 15, the information transmission apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the information transmission apparatus 800, such as the operations associated with display, telephone calls, data communications, camera operations, and recording operations. The processing component 802 may include one or more processors 820 to execute instructions to perform all or part of the steps of the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the information transmission apparatus 800. Examples of such data include instructions for any applications or methods operated on the information transmission apparatus 800, contact data, phonebook data, messages, pictures, videos, etc. The memory 804 may be implemented with any type of volatile or non-volatile memory devices, or a combination of the volatile memory device and non-volatile memory device, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the information transmission apparatus 800. The power component 806 may include a power management system, one or more power sources, and any other components associated with the generation, management, and distribution of power for the information transmission apparatus 800.

The multimedia component 808 includes a screen providing an output interface between the information transmission apparatus 800 and the user. In some examples, the screen may include a liquid crystal display (LCD) and a touch panel (TP). When the screen includes the TP, the screen may be implemented as a touch screen to receive an input signal from the user. The TP includes one or more touch sensors to sense touches, slides and gestures on the TP. The touch sensors may not only sense a boundary of a touch or a slide, but also sense a period of time and a pressure associated with the touch or the slide. In some examples, the multimedia component 808 includes a front camera and/or a rear camera. The front camera and/or the rear camera may receive external multimedia data when the information transmission apparatus 800 is in an operation mode, such as a shooting mode or a video mode. Each of the front camera and the rear camera may be a fixed optical lens system or have a focus and an optical zoom capability.

The audio component 810 is configured to output and/or input an audio signal. For example, the audio component 810 includes a microphone (MIC) configured to receive an external audio signal when the information transmission apparatus 800 is in an operation mode, such as a call mode, a recording mode, and a voice recognition mode. The received audio signal may further be stored in the memory 804 or transmitted via the communication component 816. In some examples, the audio component 810 further includes a speaker configured to output an audio signal.

The I/O interface 812 provides an interface between the processing component 802 and a peripheral interface module. The peripheral interface module may be a keyboard, a click wheel, buttons, or the like. The buttons may include, but are not limited to, a home button, a volume button, a starting button, or a locking button.

The sensor component 814 includes one or more sensors to provide state assessments of various aspects of the information transmission apparatus 800. For instance, the sensor component 814 may detect an on/off state of the information transmission apparatus 800, and relative positioning of components such as a display and a small keyboard of the information transmission apparatus 800. The sensor component 814 may further detect a change in a position of the information transmission apparatus 800 or in a position of a component of the information transmission apparatus 800, the presence or absence of contact between the user and the information transmission apparatus 800, the orientation or acceleration/deceleration of the information transmission apparatus 800, and a change in temperature of the information transmission apparatus 800. The sensor component 814 may include a proximity sensor, configured to detect the presence of nearby objects without any physical contact. The sensor component 814 may further include a light sensor, such as a complementary metal oxide semiconductor (CMOS) or charge coupled device (CCD) image sensor, configured for use in an imaging application. In some examples, the sensor component 814 may further include an accelerometer sensor, a gyroscope sensor, a magnetic sensor, a pressure sensor, or a temperature sensor.

The communication component 816 is configured to facilitate wired or wireless communications between the information transmission apparatus 800 and other devices. The information transmission apparatus 800 may access a communication standard based wireless network, such as a wireless fidelity (WiFi) network, a 2G or 3G network or a combination of the WiFi network, 2G network and 3G network. In at least some examples, the communication component 816 receives a broadcast signal or broadcast associated information from an external broadcast management system via a broadcast channel. In at least some examples, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a bluetooth (BT) technology, or other technologies.

In at least some examples, the information transmission apparatus 800 may be implemented with one or more application specific integrated circuit (ASIC), digital signal processor (DSP), digital signal processing device (DSPD), programmable logic device (PLD), field programmable gate array (FPGA), controller, micro-controller, microprocessor, or other electronic components, for performing the above described methods.

In at least some examples, a non-transitory computer-readable storage medium including an instruction is further provided, for example, the memory 804 including the instruction; and the instruction may be executed by the processing component 820 of the information transmission apparatus 800 to complete the described methods. For example, the non-transitory computer-readable storage medium may be a read only memory (ROM), a random access memory (RAM), a compact disc read-only memory (CD-ROM), a magnetic tape, a floppy disc, an optical data storage device or the like.

Figure 16:
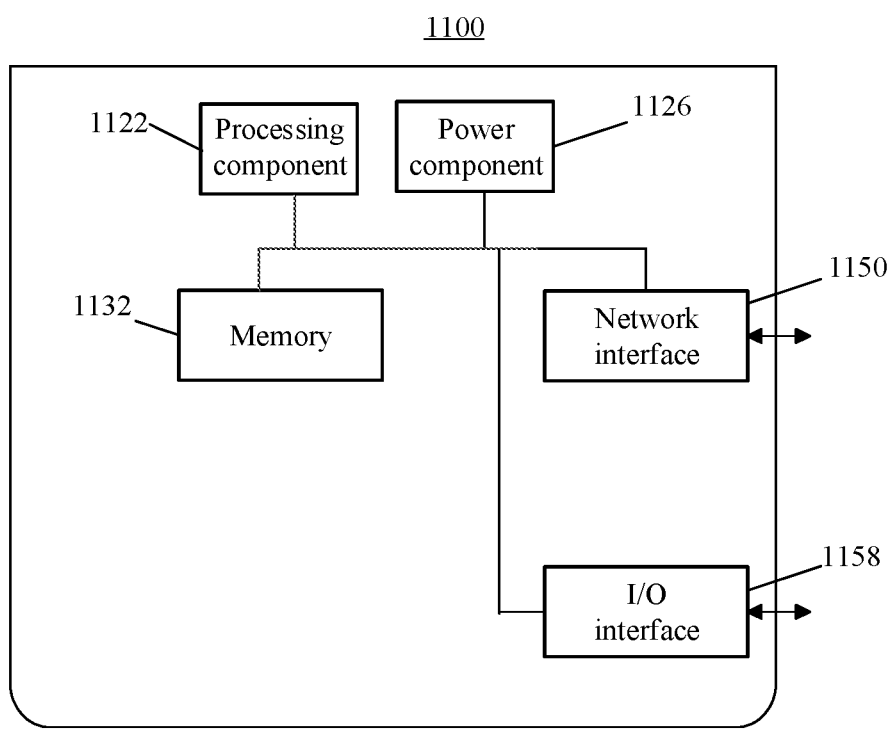
FIG. 16 is a block diagram of another information transmission apparatus according to at least some examples.

FIG. 16 is a block diagram of another information transmission apparatus according to at least some examples. For example, the information transmission apparatus 1100 may be provided as an application server. Referring to FIG. 16, the information transmission apparatus 1100 includes a processing component 1122 which further includes one or more processors, and a memory resource represented by a memory 1132 and configured to store an instruction that may be executed by the processing component 1122, such as an application program. The application program stored in the memory 1132 may include one or more modules, with each module corresponding to one group of instructions. In addition, the processing component 1122 is configured to execute the instruction to perform the above-mentioned information transmission method.

The information transmission apparatus 1100 may further include a power component 1126, configured to perform power management of the device 1100, a wired or wireless network interface 1150 configured to connect the device 1100 to the network, and an Input/Output (I/O) interface 1158. The information transmission apparatus 1100 may be operated based on an operating system stored in the memory 1132, for example, Windows Server™, Mac OS X™, Unix™, Linux™, FreeBSD™ or the like.

It is to be understood that "a plurality of" in the disclosure refers to two or greater than two, and other quantifiers are similar. "And/or" describes an association relationship for associated objects and may represent three relationships. For example, A and/or B may represent the following three cases: only A exists, both A and B exist, and only B exists. The character "/" generally indicates that the related objects are in an "or" relationship. "A/an", "said" and "the" in a singular form are also intended to include a plural form, unless other meanings are clearly denoted throughout the disclosure.

It is further to be understood that, although terms "first", "second" or the like may be adopted to describe various information, the information should not be limited to these terms. These terms are only adopted to distinguish the information of the same type from each other, rather than represent a particular sequence or importance. As a matter of fact, the terms "first", "second" or the like may be interchangeable completely. For example, without departing from the scope of the disclosure, the first information may also be called the second information and, and similarly, the second information may also be called the first information.

It is further to be understood that a "connection" includes a direct connection without other components therebetween, and also includes a indirect connection with other components therebetween, unless otherwise stated particularly.

It may further be understood that although the operations are described in a particular sequence in the accompanying drawings of the example of the disclosure, such a description should not be understood that it is needed these operations are performed according to the illustrated particular sequence or serial sequence, or it is needed all illustrated operations are performed to obtain an expected result. In a particular environment, the multi-task processing and the concurrent processing may be favorable.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the disclosure are apparent to those skilled in the art in consideration of the specification together with the practice of the disclosure here. The disclosure is intended to cover any variations, usages, or adaptations of the disclosure following the general principles of the disclosure and including common knowledge in the art or common technical measures in the art which are undisclosed in the disclosure. It is intended that the specification and examples are for illustration.

It is to be understood that the disclosure is not limited to the exact structure described above and illustrated in the accompanying drawings, and various modifications and changes may be made without departing from the scope of the disclosure.

What is claimed is:

1. An information transmission method, applied to an ultrasonic wave transmitting device, comprising:
   transmitting a Bluetooth wake-up signal;
   obtaining an ultrasonic transmission signal based on information to be transmitted; and
   transmitting the ultrasonic transmission signal to an ultrasonic wave receiving device, and
   wherein the Bluetooth wake-up signal is configured to wake up the ultrasonic wave receiving device to receive the ultrasonic transmission signal;
   wherein the information to be transmitted comprises more than one character arranged in sequence;
   wherein obtaining the ultrasonic transmission signal based on the information to be transmitted comprises:
      obtaining an encoded ultrasonic signal by encoding the information to be transmitted; and
      obtaining the ultrasonic transmission signal by performing a digital-to-analog conversion on the encoded ultrasonic signal;
      wherein obtaining the encoded ultrasonic signal by encoding the information to be transmitted comprises:
         converting the more than one character into more than one frequency value in sequence based on correspondences between the more than one character and the more than one frequency value;
         obtaining encoded subsignals corresponding to the more than one character based on the more than one frequency value; and
         encoding the encoded subsignals corresponding to the more than one character in sequence to form the encoded ultrasonic signal.

2. The information transmission method of claim 1, wherein the Bluetooth wake-up signal carries a device identifier of the ultrasonic wave transmitting device to enable the ultrasonic wave receiving device to determine the ultrasonic wave transmitting device based on the device identifier.

3. The information transmission method of claim 1, wherein transmitting the Bluetooth wake-up signal comprises:
   transmitting the Bluetooth wake-up signal based on a preset received signal strength indication (RSSI).

4. The information transmission method of claim 3, wherein transmitting the Bluetooth wake-up signal further comprises:
   transmitting, based on preset time, the Bluetooth wake-up signal within the preset time continuously; and/or
   transmitting periodically the Bluetooth wake-up signal based on a preset number of times.

5. The information transmission method of claim 1, wherein:
   encoding the encoded subsignals corresponding to the more than one character in sequence to form the encoded ultrasonic signal comprises:
      when adjacent encoded subsignals have a same frequency, connecting the adjacent encoded subsignals directly; and
      when the adjacent encoded subsignals have different frequencies, connecting the adjacent encoded subsignals in a frequency shift manner.

6. The information transmission method of claim 5, wherein encoding the encoded subsignals corresponding to the more than one character in sequence to form the encoded ultrasonic signal further comprises:
   adding fade-in before an encoded subsignal corresponding to a first character, and adding fade-out after an encoded subsignal corresponding to a last character to form the encoded ultrasonic signal.

7. The information transmission method of claim 1, wherein transmitting the ultrasonic transmission signal to the ultrasonic wave receiving device comprises:
   transmitting the ultrasonic transmission signal to the ultrasonic wave receiving device in a preset interval.

8. An information transmission method, applied to an ultrasonic wave receiving device, comprising:
   receiving a Bluetooth wake-up signal transmitted from an ultrasonic wave transmitting device;
   generating a wake-up instruction based on the Bluetooth wake-up signal;
   receiving, in response to the wake-up instruction, an ultrasonic transmission signal transmitted from the ultrasonic wave transmitting device; and
   obtaining corresponding transmission information based on the ultrasonic transmission signal;
   wherein the digital transmission signal comprises more than one encoded subsignal arranged in sequence;
   wherein obtaining the corresponding transmission information based on the ultrasonic transmission signal comprises:
      converting the ultrasonic transmission signal into a digital transmission signal; and
      obtaining the transmission information by decoding the digital transmission signal;
      wherein obtaining the transmission information by decoding the digital transmission signal comprises:
         obtaining more than one character corresponding to the more than one encoded subsignal by decoding the more than one encoded subsignal in sequence; and
         forming the transmission information with the more than one character arranged in sequence,
         wherein obtaining the more than one character corresponding to the more than one encoded subsignal by decoding the more than one encoded subsignal in sequence comprises:
            obtaining enframed data corresponding to the digital transmission signal by enframing the digital transmission signal;
            obtaining frequency domain information of the enframed data by performing a Fourier Transform (FT) on the enframed data;
            computing a power of the enframed data at an encoding frequency point based on the frequency domain information, wherein the encoding frequency point is obtained through performing the FT based on a frequency corresponding to the more than one character; and
            determining the more than one character corresponding to the more than one encoded subsignal in sequence based on the power of the enframed data at the encoding frequency point.

9. The information transmission method of claim 8, wherein receiving the Bluetooth wake-up signal transmitted from the ultrasonic wave transmitting device comprises:

receiving a Bluetooth signal;
determining whether a device identifier corresponding to the ultrasonic wave transmitting device exists in the Bluetooth signal; and
determining the Bluetooth signal as the Bluetooth wake-up signal when the device identifier corresponding to the ultrasonic wave transmitting device exists.

10. The information transmission method of claim 9, wherein generating the wake-up instruction based on the Bluetooth wake-up signal comprises:
detecting a received signal strength indication (RSSI) of the Bluetooth wake-up signal in response to the Bluetooth wake-up signal; and
generating the wake-up instruction when the RSSI is greater than or equal to a strength threshold, and/or when a change of the RSSI meets a preset condition.

11. The information transmission method of claim 8, wherein receiving, in response to the wake-up instruction, the ultrasonic transmission signal transmitted from the ultrasonic wave transmitting device comprises:
receiving, through waking up an ultrasonic acquisition assembly of the ultrasonic wave receiving device, the ultrasonic transmission signal transmitted from the ultrasonic wave transmitting device, wherein the ultrasonic acquisition assembly at least comprises an acoustic wave receiver.

12. The information transmission method of claim 8, wherein the transmission information is data or an instruction; and the information transmission method further comprises:
storing the data or executing the instruction, based on the transmission information.

13. An electronic device, comprising:
a processor; and
a memory, configured to store instructions executable by the processor,
wherein the processor is configured to call the instructions to perform:
transmitting a Bluetooth wake-up signal;
obtaining an ultrasonic transmission signal based on information to be transmitted; and
transmitting the ultrasonic transmission signal to an ultrasonic wave receiving device, and
wherein the Bluetooth wake-up signal is configured to wake up the ultrasonic wave receiving device to receive the ultrasonic transmission signal;
wherein the information to be transmitted comprises more than one character arranged in sequence;
wherein obtaining the ultrasonic transmission signal based on the information to be transmitted comprises:
obtaining an encoded ultrasonic signal by encoding the information to be transmitted; and
obtaining the ultrasonic transmission signal by performing a digital-to- analog conversion on the encoded ultrasonic signal;
wherein obtaining the encoded ultrasonic signal by encoding the information to be transmitted comprises:
converting the more than one character into more than one frequency value in sequence based on correspondences between the more than one character and the more than one frequency value;
obtaining encoded subsignals corresponding to the more than one character based on the more than one frequency value; and
encoding the encoded subsignals corresponding to the more than one character in sequence to form the encoded ultrasonic signal.

14. The electronic device of claim 13, wherein the Bluetooth wake-up signal carries a device identifier of the ultrasonic wave transmitting device to enable the ultrasonic wave receiving device to determine the ultrasonic wave transmitting device based on the device identifier.

15. The electronic device of claim 13, wherein transmitting the Bluetooth wake-up signal comprises:
transmitting the Bluetooth wake-up signal based on a preset received signal strength indication (RSSI).

* * * * *